United States Patent
Iwai et al.

(10) Patent No.: US 11,906,164 B2
(45) Date of Patent: Feb. 20, 2024

(54) GAS TURBINE COMBUSTOR

(71) Applicant: TOSHIBA ENERGY SYSTEMS & SOLUTIONS CORPORATION, Kawasaki (JP)

(72) Inventors: Yasunori Iwai, Yokohama Kanagawa (JP); Masao Itoh, Yokohama Kanagawa (JP); Yuichi Morisawa, Yokohama Kanagawa (JP); Yoshihisa Kobayashi, Yokohama Kanagawa (JP); Shinju Suzuki, Yokohama Kanagawa (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/157,565

(22) Filed: Jan. 20, 2023

(65) Prior Publication Data
US 2023/0151965 A1   May 18, 2023

Related U.S. Application Data

(62) Division of application No. 17/165,147, filed on Feb. 2, 2021, now Pat. No. 11,578,867.

(30) Foreign Application Priority Data

Feb. 10, 2020 (JP) ................................. 2020-020881

(51) Int. Cl.
*F02C 7/264* (2006.01)
*F23R 3/00* (2006.01)
*F02C 6/00* (2006.01)

(52) U.S. Cl.
CPC ............. *F23R 3/002* (2013.01); *F02C 6/00* (2013.01); *F02C 7/264* (2013.01); *F05D 2220/32* (2013.01); *F05D 2240/35* (2013.01)

(58) Field of Classification Search
CPC .......... F23R 2900/000006; F02C 7/264; F23Q 13/005
See application file for complete search history.

(56) References Cited

U.S. PATENT DOCUMENTS

| 5,367,869 A | 11/1994 | De Freitas |
| 5,573,565 A | 11/1996 | Dalton et al. |

(Continued)

FOREIGN PATENT DOCUMENTS

| JP | S57-179338 A | 11/1982 |
| JP | 2012-097747 A | 5/2012 |

(Continued)

OTHER PUBLICATIONS

U.S. Final Office Action on U.S. Appl. No. 17/165,147 dated Apr. 4, 2022 (14 pages).

(Continued)

*Primary Examiner* — Gerald L Sung
(74) *Attorney, Agent, or Firm* — Foley & Lardner LLP

(57) ABSTRACT

A combustor of an embodiment includes: a combustor casing; a combustor liner which is provided in the combustor casing and combusts a fuel and an oxidant to produce a combustion gas; a pipe-shaped member provided to penetrate the combustor casing and the combustor liner; a heat-resistant glass which is provided on the combustor casing side in the pipe-shaped member and closes the pipe-shaped member; a laser light supply mechanism which irradiates an interior of the combustor liner through the heat-resistant glass and an interior of the pipe-shaped member with a laser light; and a contact prevention mechanism which prevents a combustion gas in the combustor liner from coming into contact with the heat-resistant glass.

2 Claims, 10 Drawing Sheets

(56) References Cited

U.S. PATENT DOCUMENTS

| | | | |
|---|---|---|---|
| 5,636,511 A * | 6/1997 | Pfefferle | F23C 13/00 |
| | | | 60/39.822 |
| 7,490,472 B2 | 2/2009 | Lynghjem et al. | |
| 8,616,006 B2 | 12/2013 | Rocci Denis | |
| 2011/0185996 A1 | 8/2011 | Kraus et al. | |
| 2012/0107750 A1 | 5/2012 | Krull | |
| 2012/0131927 A1 | 5/2012 | Rocci Denis et al. | |
| 2018/0023478 A1* | 1/2018 | Morisawa | F23Q 3/008 |
| | | | 60/740 |
| 2019/0145319 A1 | 5/2019 | Iwai | |

FOREIGN PATENT DOCUMENTS

| | | | |
|---|---|---|---|
| JP | 2012-117535 A | 6/2012 | |
| JP | 2016-008590 A | 1/2016 | |
| WO | WO-2018/025294 A1 | 2/2018 | |

OTHER PUBLICATIONS

U.S. Non-Final (Restriction Requirement) Office Action on U.S. Appl. No. 17/165,147 dated Oct. 1, 2021 (6 pages).

U.S. Non-Final Office Action on U.S. Appl. No. 17/165,147 dated Dec. 21, 2021 (12 pages).

U.S. Notice of Allowance on U.S. Appl. No. 17/165,147 dated Oct. 17, 2022 (8 pages).

* cited by examiner

GAS TURBINE COMBUSTOR

CROSS REFERENCE TO RELATED APPLICATIONS

This application is a divisional application of U.S. patent application Ser. No. 17/165,147, filed on Feb. 2, 2021, which is based upon and claims the benefit of priority from Japanese Patent Application No. 2020-020881, filed on Feb. 10, 2020; the entire contents of which are incorporated herein by reference.

FIELD

Embodiments described herein relate generally to a gas turbine combustor.

BACKGROUND

Increasing the efficiency of power generation plants is in progress in response to demands for reduction of carbon dioxide, resource conservation, and the like. Specifically, increasing the temperature of a working fluid of a gas turbine, employing a combined cycle, and the like are actively in progress. Further, research and development of collection techniques of carbon dioxide are also in progress.

Under such circumstances, a gas turbine facility including a combustor which combusts a fuel and oxygen in a supercritical $CO_2$ atmosphere (to be referred to as a $CO_2$ gas turbine facility, hereinafter) is under consideration. In this $CO_2$ gas turbine facility, a part of a combustion gas produced in the combustor is circulated in a system as a working fluid.

Therefore, in the $CO_2$ gas turbine facility, excess oxygen and fuel preferably do not remain in the combustion gas discharged from the combustor. Thus, flow rates of the fuel and an oxidant are regulated so as to have a stoichiometric mixture ratio (equivalence ratio 1), for example.

Incidentally, the equivalence ratio which is mentioned here is an equivalence ratio calculated based on a fuel flow rate and an oxygen flow rate. In other words, it is an equivalence ratio when it is assumed that the fuel and the oxygen are uniformly mixed (overall equivalence ratio).

In the combustor of the $CO_2$ gas turbine facility, a fuel-oxidant mixture mixed in the combustor is ignited by using an ignition device. At present, as the ignition device included in the combustor of the $CO_2$ gas turbine facility, a laser spark ignition device is under consideration. The laser ignition device irradiates the mixture inside the combustor with laser light to cause ignition.

The laser spark ignition device includes a laser oscillator, a lens, a heat-resistant glass provided in a casing part, and a laser passage pipe coupling a casing and a combustor liner, for example. Then, the interior of the combustor liner is irradiated through the lens, the heat-resistant glass, and the laser passage pipe with laser light emitted from the laser oscillator.

Then, the laser light is focused in the combustor liner. By the laser light being focused, an energy density increases. Then, gas in the portion where the energy density increases is plasmatized (breaks down) to ignite the mixture.

In the above-described laser ignition device of the $CO_2$ gas turbine facility, the combustion gas sometimes flows into the laser passage pipe. Then, an inner surface of the heat-resistant glass is exposed to the combustion gas and impurities such as soot adhere to the inner surface of the heat-resistant glass in some cases. This sometimes causes a reduction in transmittance of the laser light passing through the heat-resistant glass, resulting in not enabling stable ignition.

DETAILED DESCRIPTION

Hereinafter, embodiments of the present invention will be described with reference to the drawings.

In one embodiment, a gas turbine combustor includes: a casing; a combustion cylinder which is provided in the casing and combusts a fuel and an oxidant to produce a combustion gas; a pipe-shaped member provided to penetrate the casing and the combustion cylinder; a heat-resistant glass which is provided on the casing side in the pipe-shaped member and closes the pipe-shaped member; a laser light supply mechanism which irradiates an interior of the combustion cylinder through the heat-resistant glass and an interior of the pipe-shaped member with a laser light; and a contact prevention mechanism which prevents a combustion gas in the combustion cylinder from coming into contact with the heat-resistant glass.

First Embodiment

Figure 1:
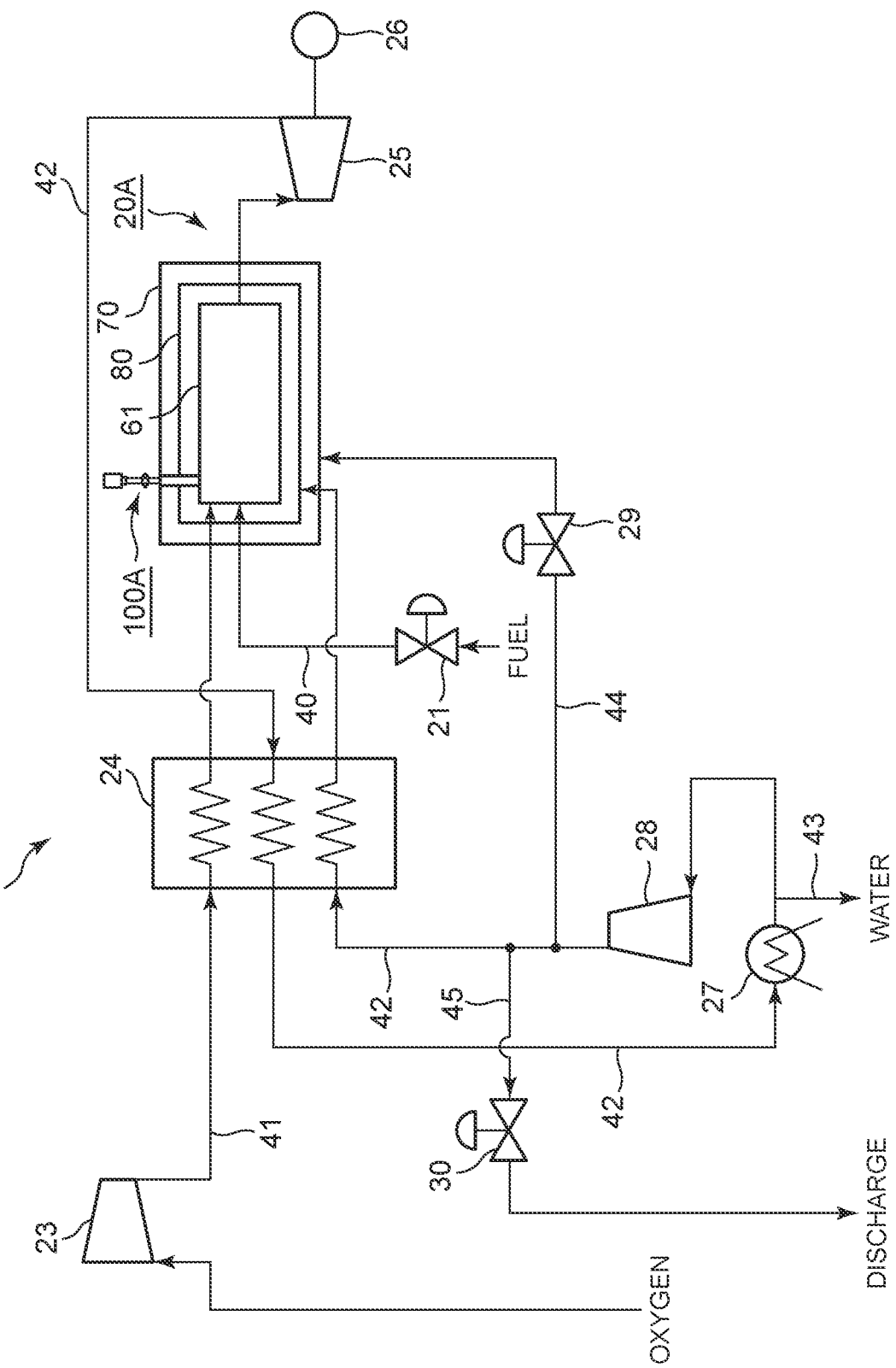
FIG. 1 is a system diagram of a gas turbine facility including a combustor of a first embodiment.

FIG. 1 is a system diagram of a gas turbine facility 10 including a combustor 20A of a first embodiment. As illustrated in FIG. 1, the gas turbine facility 10 includes the combustor 20A which combusts a fuel and an oxidant, a pipe 40 which supplies the fuel to the combustor 20A, and a pipe 41 which supplies the oxidant to the combustor 20A. Further, the combustor 20A includes an ignition device 100A which ignites a mixture of the fuel and the oxidant in the combustor 20A. Note that the combustor 20A functions as a gas turbine combustor.

The pipe 40 includes a flow rate regulating valve 21 which regulates a flow rate of the fuel to be supplied into a combustor liner 61 of the combustor 20A. Here, as the fuel, for example, hydrocarbon such as methane or natural gas is used. Further, as the fuel, for example, a coal gasification gas fuel containing carbon monoxide, hydrogen, and the like can also be used. Note that the combustor liner 61 functions as a combustion cylinder.

The pipe 41 is provided with a compressor 23 which pressurizes the oxidant. As the oxidant, for example, oxygen separated from the atmosphere by an air separating apparatus (not illustrated) is used. The oxidant flowing through the pipe 41 is heated by passing through a heat exchanger 24 to be supplied to the combustor 20A.

The fuel and the oxidant guided to the combustor liner 61 undergo reaction (combustion) in a combustion region in the combustor liner 61 and are turned into a combustion gas. Here, in the gas turbine facility 10, a part of the combustion gas exhausted from a turbine 25 is circulated in the system, which is described later. Therefore, excess oxidant (oxygen) and fuel preferably do not remain in the combustion gas discharged from the combustor liner 61.

Thus, flow rates of the fuel and the oxidant are regulated so as to have a stoichiometric mixture ratio (equivalence ratio 1), for example. Note that the equivalence ratio mentioned here is an equivalence ratio (overall equivalence ratio) when it is assumed that the fuel and the oxygen are uniformly mixed.

Further, the gas turbine facility 10 includes a turbine 25, a generator 26, a heat exchanger 24, a cooler 27, and a compressor 28. Moreover, the gas turbine facility 10 includes a pipe 42 for circulating a part of the combustion gas discharged from the turbine 25 in the system.

The turbine 25 is moved rotationally by the combustion gas discharged from the combustor liner 61. To the turbine 25, for example, the generator 26 is coupled. The combustion gas discharged from the combustor liner 61, which is mentioned here, is one containing a combustion product produced from the fuel and the oxidant and carbon dioxide to be circulated in the combustor liner 61 (a combustion gas from which water vapor has been removed).

The combustion gas discharged from the turbine 25 is guided to the pipe 42 and cooled by passing through the heat exchanger 24. At this time, the oxidant flowing through the pipe 41 and carbon dioxide flowing through the pipe 42 to be circulated through the combustor 20A are heated by heat release from the combustion gas.

The combustion gas having passed through the heat exchanger 24 passes through the cooler 27. By the combustion gas passing through the cooler 27, the water vapor contained in the combustion gas is removed therefrom. At this time, the water vapor in the combustion gas condenses into water. This water is discharged through a pipe 43 to the outside, for example.

Here, as described previously, when the flow rates of the fuel and the oxidant are regulated so as to have the stoichiometric mixture ratio (equivalence ratio 1), most of components of the combustion gas (dry combustion gas) from which the water vapor has been removed are carbon dioxide. Note that, for example, a slight amount of carbon monoxide, or the like is sometimes mixed in the combustion gas from which the water vapor has been removed, but hereinafter, the combustion gas from which the water vapor has been removed is simply referred to as carbon dioxide.

The carbon dioxide is pressurized to a pressure equal to or more than a critical pressure by the compressor 28 interposed in the pipe 42 to become a supercritical fluid. A part of the pressurized carbon dioxide flows through the pipe 42 and is heated in the heat exchanger 24. Then, the carbon dioxide is guided between the combustor liner 61 and a cylinder body 80. The temperature of the carbon dioxide having passed through the heat exchanger 24 becomes, for example, about 700° C. Note that the pipe 42 which supplies carbon dioxide between the combustor liner 61 and the cylinder body 80 also functions as a first fluid supply part.

Another part of the pressurized carbon dioxide is introduced to a pipe 44 branching off from the pipe 42, for example. The carbon dioxide introduced to the pipe 44 is guided between a combustor casing 70 and the cylinder body 80 as a cooling medium after its flow rate is regulated by a flow rate regulating valve 29. The temperature of the carbon dioxide guided between the combustor casing 70 and the cylinder body 80 by the pipe 44 is, for example, about 400° C.

This temperature of the carbon dioxide guided between the combustor casing 70 and the cylinder body 80 is lower than the previously-described temperature of the carbon dioxide guided between the combustor liner 61 and the cylinder body 80. Note that the pipe 44 which supplies the carbon dioxide between the combustor casing 70 and the cylinder body 80 also functions as a first fluid supply part. Further, the combustor casing 70 functions as a casing.

Meanwhile, further another part of the pressurized carbon dioxide is introduced to a pipe 45 branching off from the pipe 42. The carbon dioxide introduced to the pipe 45 is discharged to the outside after its flow rate is regulated by a flow rate regulating valve 30. Note that the pipe 45 functions as a discharge pipe. The carbon dioxide discharged to the outside can be utilized for EOR (Enhanced Oil Recovery) or the like employed at an oil drilling field, for example.

Next, a configuration of the combustor 20A of the first embodiment is described in detail.

Figure 2:
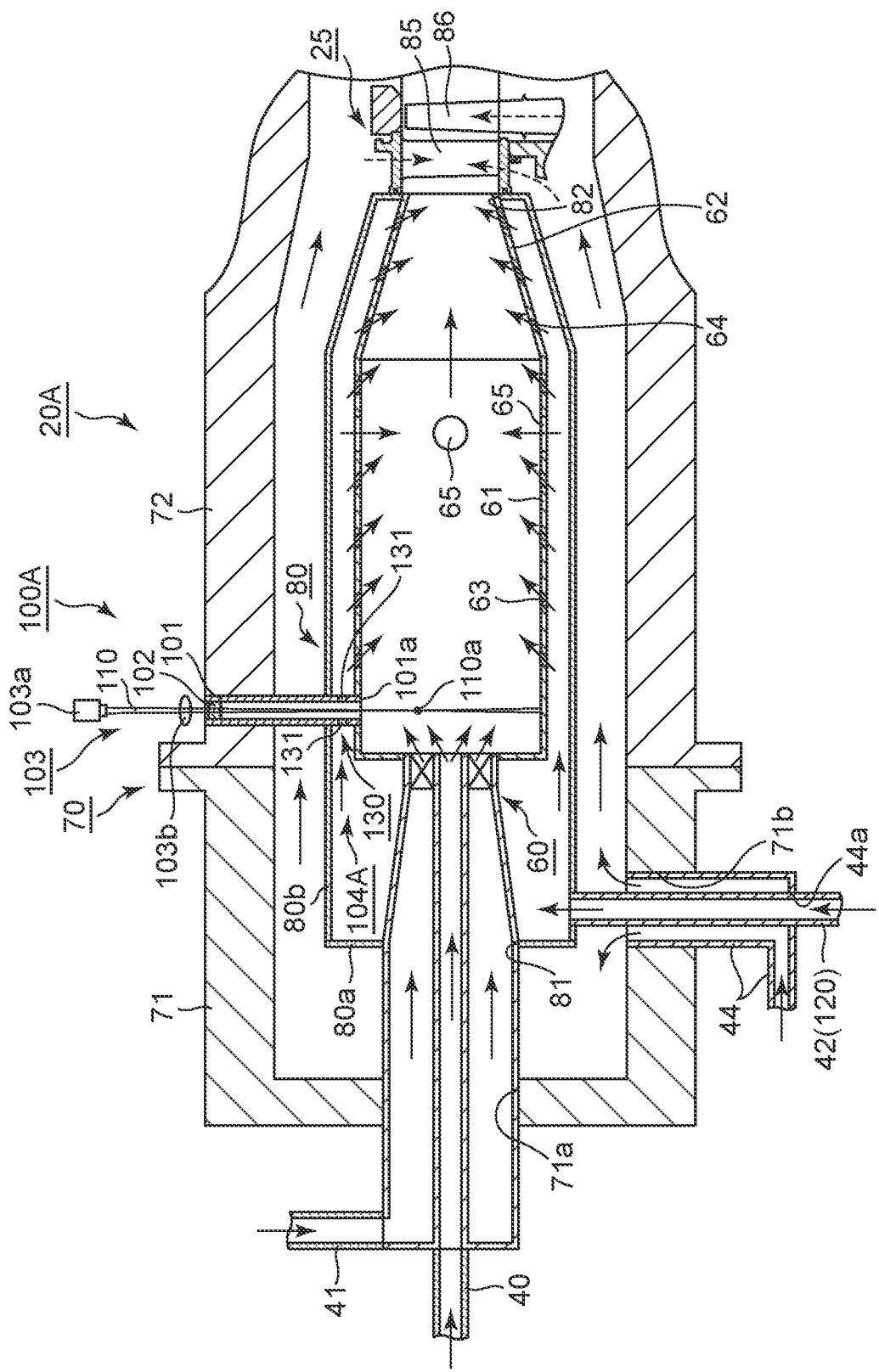
FIG. 2 is a view schematically illustrating a longitudinal section of the combustor of the first embodiment.
Figure 3:
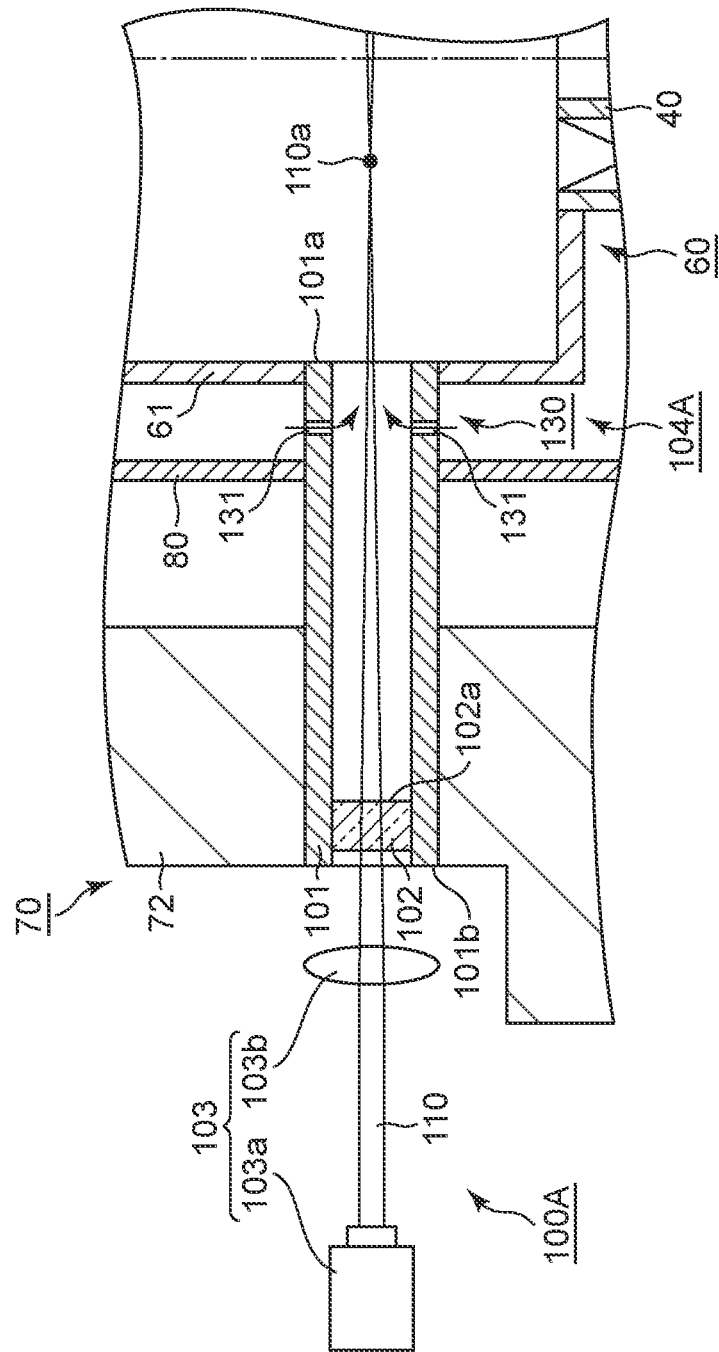
FIG. 3 is an enlarged view schematically illustrating a longitudinal section of an ignition device in the combustor of the first embodiment.

FIG. 2 is a view schematically illustrating a longitudinal section of the combustor 20A of the first embodiment. FIG. 3 is an enlarged view schematically illustrating a longitudinal section of the ignition device 100A in the combustor 20A of the first embodiment.

As illustrated in FIG. 2, the combustor 20A includes a fuel nozzle part 60, the combustor liner 61, a transition piece 62, the combustor casing 70, the cylinder body 80, and the ignition device 100A.

The fuel nozzle part 60 ejects the fuel supplied from the pipe 40 and the oxidant supplied from the pipe 41 into the combustor liner 61. For example, the fuel is ejected from the center and the oxidant is ejected from the periphery of the center.

The combustor casing 70 is provided along a longitudinal direction of the combustor 20A so as to surround a part of the fuel nozzle part 60, the combustor liner 61, and the transition piece 62, for example. The combustor casing 70 is divided into two parts in the longitudinal direction of the combustor 20A, for example. The combustor casing 70 is constituted of an upstream-side casing 71 on an upstream side and a downstream-side casing 72 on a downstream side, for example.

The upstream-side casing 71 is constituted by a cylinder body having one end (upstream end) thereof closed and the other end (downstream end) thereof opened, for example. In the center of the one end, an opening 71a into which the fuel nozzle part 60 is inserted is formed. Further, the pipe 44 is coupled to a side portion of the upstream-side casing 71. The pipe 44 is fitted in and joined to an opening 71b formed in the side portion of the upstream-side casing 71, for example.

The downstream-side casing 72 is constituted by a cylinder body having both ends thereof opened. One end of the downstream-side casing 72 is connected to the upstream-side casing 71. The other end of the downstream-side casing 72 is connected to, for example, a casing surrounding the turbine 25.

As illustrated in FIG. 2, in the combustor casing 70, the cylinder body 80 which surrounds peripheries of a part of the fuel nozzle part 60, the combustor liner 61, and the transition piece 62 and demarcates a space between the combustor casing 70 and the combustor liner 61 is provided. Predetermined spaces exist between the combustor liner 61 and the cylinder body 80 and between the combustor casing 70 and the cylinder body 80.

The cylinder body 80 has one end (upstream end) thereof closed, in which an opening 81 into which the fuel nozzle part 60 is inserted is formed. The cylinder body 80 has the other end (downstream end) thereof closed, in which an opening 82 through which a downstream end of the transition piece 62 penetrates is formed. The cylinder body 80 is formed by joining a plate-shaped lid member 80a having the opening 81 therein to a cylindrical main body member 80b, for example.

A configuration of the cylinder body 80 is not limited as long as the cylinder body 80 has a structure which surrounds the peripheries of a part of the fuel nozzle part 60, the combustor liner 61, and the transition piece 62 as illustrated in FIG. 2.

An inner peripheral surface of the downstream-side opening 82 in the cylinder body 80 is in contact with an outer peripheral surface of the downstream end portion of the transition piece 62.

Further, the pipe 42 is coupled to an upstream-side side portion of the cylinder body 80. The pipe 42 is coupled to the side portion of the cylinder body 80 by passing through the interior of the pipe 44 coupled to the side portion of the upstream-side casing 71, as illustrated in FIG. 2, for example. The pipe 44 and the pipe 42 passes through the interior of the pipe 44 form a double-pipe structure.

Incidentally, the pipe 42 is inserted through an opening 44a formed in the pipe 44 into the interior of the pipe 44, for example. Then, the pipe 42 is joined to the pipe 44 in an opening portion having the opening 44a, for example. Further, the double-pipe structure of the pipe 42 and the pipe 44 is not limited to being provided at one place and may be plurally provided in a circumferential direction.

The ignition device 100A includes a pipe-shaped member 101, a heat-resistant glass 102, a laser light supply mechanism 103, and a contact prevention mechanism 104A as illustrated in FIG. 2 and FIG. 3.

The pipe-shaped member 101 is constituted by a cylindrical pipe having both ends thereof opened, or the like. The pipe-shaped member 101 is provided to penetrate the combustor casing 70, the cylinder body 80, and the combustor liner 61. In other words, the pipe-shaped member 101 is disposed so as to penetrate through a coaxial circular communication hole (through hole) formed in each of the combustor casing 70, the cylinder body 80, and the combustor liner 61 from the direction perpendicular to the longitudinal direction of the combustor 20A.

Incidentally, an inner end portion 101a of the pipe-shaped member 101 is configured not to project to the interior of the combustor liner 61. Further, an inside diameter of the pipe-shaped member 101 is set to the extent that laser light is not hindered when it passes through the interior of the pipe-shaped member 101.

The heat-resistant glass 102 is provided on the outer side (combustor casing 70 side) in the pipe-shaped member 101. Specifically, the heat-resistant glass 102 is preferably provided in the pipe-shaped member 101 on a side close to the outside than a flow path between the combustor casing 70 and the cylinder body 80, through which the carbon dioxide flows. For example, the heat-resistant glass 102 is provided on an outer end portion 101b side of the pipe-shaped member 101.

The heat-resistant glass 102 is provided so as to close the interior of the pipe-shaped member 101. This shuts off communication between the inside and the outside of the combustor 20A.

The laser light supply mechanism 103 irradiates the interior of the combustor liner 61 through the heat-resistant glass 102 and the interior of the pipe-shaped member 101 with a laser light 110. The laser light supply mechanism 103 includes a laser oscillator 103a and a condensing lens 103b.

The condensing lens 103b is provided outside the combustor casing 70 (downstream-side casing 72) to face the heat-resistant glass 102. That is, the condensing lens 103b is provided between the laser oscillator 103a and the heat-resistant glass 102. A focal length and an installation position of the condensing lens 103b are set so as to have a focal point 11a at a position suitable for igniting the fuel-air mixture.

The laser oscillator 103a is disposed outside the combustor casing 70. The laser oscillator 103a irradiates the interior of the combustor liner 61 through the condensing lens 103b, the heat-resistant glass 102, and the interior of the pipe-shaped member 101 with the laser light 110. That is, the laser oscillator 103a is disposed so as to be able to irradiate the interior of the combustor liner 61 with the laser light 110 by passing the laser light 110 through the condensing lens 103b, the heat-resistant glass 102, and the interior of the pipe-shaped member 101 in this order.

Incidentally, the condensing lens 103b may be irradiated through an optical fiber with the laser light 110 oscillated by the laser oscillator 103a.

The contact prevention mechanism 104A prevents the combustion gas in the combustor liner 61 from coming into contact with the heat-resistant glass 102. The contact prevention mechanism 104A includes a fluid supply part 120 and an ejection part 130.

The fluid supply part 120 supplies a fluid for preventing the contact between the combustion gas in the combustor liner 61 and the heat-resistant glass 102. Note that the fluid for preventing the contact between the combustion gas in the combustor liner 61 and the heat-resistant glass 102 is hereinafter referred to as a contact prevention fluid.

The fluid supply part 120 supplies the contact prevention fluid between the combustor casing 70 and the combustor liner 61. Here, specifically, the fluid supply part 120 supplies the contact prevention fluid between the combustor liner 61 and the cylinder body 80.

Here, the fluid supply part 120 is constituted of the pipe 42 which circulates the carbon dioxide heated in the heat exchanger 24 between the combustor liner 61 and the cylinder body 80. Note that, the fluid supply part 120 functions as the first fluid supply part, and the contact prevention fluid to be supplied by the fluid supply part 120 functions as a first fluid.

Further, the carbon dioxide supplied between the combustor liner 61 and the cylinder body 80 also functions as a cooling medium to cool the combustor liner 61 and the transition piece 62 other than the function as the contact prevention fluid.

The ejection part 130 ejects the contact prevention fluid into the pipe-shaped member 101. The ejection part 130 has a plurality of ejection holes 131 formed in a circumferential direction of the pipe-shaped member 101.

The ejection part 130 is formed in the pipe-shaped member 101 located between the combustor liner 61 and the cylinder body 80, for example. In other words, the ejection holes 131 are formed in the circumferential direction of the pipe-shaped member 101 located between the combustor liner 61 and the cylinder body 80.

The ejection hole 131 is constituted by a circular hole, a slit, or the like. Further, the ejection holes 131 are disposed uniformly in the circumferential direction of the pipe-shaped member 101. The ejection holes 131 each penetrate in a direction perpendicular to a center axis of the pipe-shaped member 101, for example.

Here, a pressure of the contact prevention fluid to be ejected into the pipe-shaped member 101 is higher than a pressure in the combustor liner 61. Therefore, the combustion gas flowing into the pipe-shaped member 101 does not pass through the ejection holes 131 to flow in between the combustor liner 61 and the cylinder body 80. In other words, the contact prevention fluid ejected from the ejection holes 131 into the pipe-shaped member 101 flows into the combustor liner 61.

Next, the operation of the combustor 20A is described.

At the time of ignition, the laser oscillator 103a is driven to oscillate the laser light 110. The laser light 110 oscillated by the laser oscillator 103a passes through the condensing lens 103b and the heat-resistant glass 102 to enter the pipe-shaped member 101. The laser light 110 having passed through the interior of the pipe-shaped member 101 is focused on the focal point 110a in a predetermined region in the combustor liner 61. Note that the laser light 110 travels from the focal point 110a in a traveling direction while expanding a beam diameter.

After the irradiation of the interior of the combustor liner 61 with the laser light 110, the fuel and the oxygen are ejected from the fuel nozzle part 60 into the combustor liner 61. At this time, the fuel and the oxygen are ejected from the fuel nozzle part 60 in a state of the oxidant flow rate and the fuel flow rate being reduced in order to suppress a sudden heat load on the combustor 20A.

The oxidant and the fuel ejected from the fuel nozzle part 60 flow while mixing together to create a mixture. Then, when the mixture flows to a high energy density position where the laser light is focused on the focal point 110a, the mixture is ignited. This initiates combustion. Note that drive of the ignition device 100A is stopped when the combustion in the combustor liner 61 is stabilized, for example.

Then, after the ignition, the flow rate of the circulating carbon dioxide and the oxidant flow rate are increased to increase the pressure in the combustor, and at the same time, the fuel flow rate is increased to increase the combustion gas temperature in the combustor. Then, the fuel flow rate, the flow rate of the circulating carbon dioxide, and the oxidant flow rate are increased up to a rated load condition of the turbine.

Since the action of the combustion gas discharged from the combustor liner 61 has been already described with reference to FIG. 1, flows of the carbon dioxide introduced from the pipe 42 and the pipe 44 into the combustor 20A are described here with reference to FIG. 2 and FIG. 3.

A part of the carbon dioxide introduced from the pipe 42 into the cylinder body 80 functions as the contact prevention fluid. As illustrated in FIG. 3, a part of the carbon dioxide passes through the ejection holes 131 of the pipe-shaped member 101 to be ejected into the pipe-shaped member 101. Note that in FIG. 3, flows of the contact prevention fluid (carbon dioxide) ejected from the ejection holes 131 are indicated by arrows.

The flows of the contact prevention fluid (carbon dioxide) ejected from the ejection holes 131 each travel in the direction perpendicular to the center axis of the pipe-shaped member 101, and at the same time, turn to the combustor liner 61 side, as illustrated in FIG. 3, for example. That is, in the pipe-shaped member 101, a flow field toward the interior of the combustor liner 61 is formed by the contact prevention fluid ejected from the ejection holes 131.

Further, in the interior of the pipe-shaped member 101 being an inner side of the ejection holes 131, such a flow field as to shut off a cross section of the interior of the pipe-shaped member 101 is formed by the contact prevention fluid ejected from the plurality of ejection holes 131 formed in the circumferential direction.

Here, the contact prevention fluid to be ejected from the ejection holes 131 preferably has a penetration force to the extent of being capable of reaching the vicinity of the center axis of the pipe-shaped member 101. Specifically, the contact prevention fluid to be ejected from the ejection holes 131 preferably has a penetration force to the extent of coming into contact with an outer periphery of the laser light 110 (laser beam) passing through the center of the pipe-shaped member 101, for example.

The above-described flows formed by the contact prevention fluid ejected from the ejection holes 131 prevent the combustion gas in the combustor liner 61 from flowing into the pipe-shaped member 101. Alternatively, the flows formed by the contact prevention fluid ejected from the ejection holes 131 prevent the combustion gas flowing from the interior of the combustor liner 61 into the pipe-shaped member 101 from flowing into the side closer to the heat-resistant glass 102 from positions formed with the ejection holes 131.

This makes it possible to prevent the combustion gas in the combustor liner 61 from coming into contact with the heat-resistant glass 102 (an inner surface 102a of the heat-resistant glass 102). Then, impurities such as soot contained in the combustion gas do not adhere to the inner surface 102a of the heat-resistant glass 102. Therefore, it is possible to prevent a reduction in transmittance of the laser light 110 passing through the heat-resistant glass 102.

Incidentally, the contact prevention fluid ejected from the ejection holes 131 into the pipe-shaped member 101 flows into the combustor liner 61. The contact prevention fluid flowing into the combustor liner 61 is introduced into the transition piece 62 together with the combustion gas.

Here, a flow rate of the contact prevention fluid to be ejected to the pipe-shaped member 101 can be regulated by a hole diameter of the ejection hole 131 and the number of the ejection holes 131. The flow rate of the contact prevention fluid to be ejected from the ejection holes 131 into the pipe-shaped member 101 is preferably a minimum flow rate which can prevent inflow of the combustion gas to the heat-resistant glass 102 side.

This allows flames to be formed in the combustor liner 61 without being affected by the contact prevention fluid flowing from the pipe-shaped member 101 into the combustor liner 61.

On one hand, the remaining part of the carbon dioxide introduced from the pipe 42 into the cylinder body 80 flows through an annular space between the combustor liner 61 and the cylinder body 80 to the downstream side. At this time, the carbon dioxide cools the combustor liner 61 and the transition piece 62.

Then, the carbon dioxide is introduced from, for example, holes 63, 64 of a porous film cooling part, dilution holes 65, and the like in the combustor liner 61 and the transition piece 62 into the combustor liner 61 and the transition piece 62. The carbon dioxide introduced into the combustor liner 61 and the transition piece 62 is introduced to the turbine 25 together with the combustion gas produced by the combustion.

As illustrated in FIG. 2, the low-temperature carbon dioxide flowing through the pipe 44 is guided to a double pipe constituted by the pipe 42 and the pipe 44. The carbon dioxide guided to the double pipe passes through an annular passage between the pipe 42 and the pipe 44 to be guided between the combustor casing 70 and the cylinder body 80.

The carbon dioxide guided between the combustor casing 70 and the cylinder body 80 flows through the annular space between the combustor casing 70 and the cylinder body 80 to the downstream side. At this time, the carbon dioxide cools the combustor casing 70, the cylinder body 80, and the pipe-shaped member 101 of the ignition device 100A. This carbon dioxide is used also for cooling stator blades 85 and rotor blades 86 of the turbine 25, for example. By such cooling, the temperature of the combustor casing 70 becomes, for example, about 400° C.

Therefore, it is possible to maintain the temperature of the combustor casing 70 with the heat-resistant glass 102 of the ignition device 100A installed therein to about 400° C. even at the time of the turbine rated load of the $CO_2$ gas turbine facility. That is, the temperature of the heat-resistant glass 102 of the ignition device 100A is maintained to about 400° C.

According to the combustor 20A of the first embodiment as described above, including the contact prevention mechanism 104A makes it possible to prevent the contact between the heat-resistant glass 102 included in the pipe-shaped member 101 of the ignition device 100A and the combustion gas. Therefore, the impurities such as soot do not adhere to the inner surface 102a of the heat-resistant glass 102. This prevents the reduction in transmittance of the laser light 110 passing through the heat-resistant glass 102, resulting in enabling stable ignition.

Here, in the above-described embodiment, one example of the ejection holes 131 each penetrating in the direction perpendicular to the center axis of the pipe-shaped member 101 is indicated, but a configuration of the ejection hole 131 is not limited to this.

Figure 4:
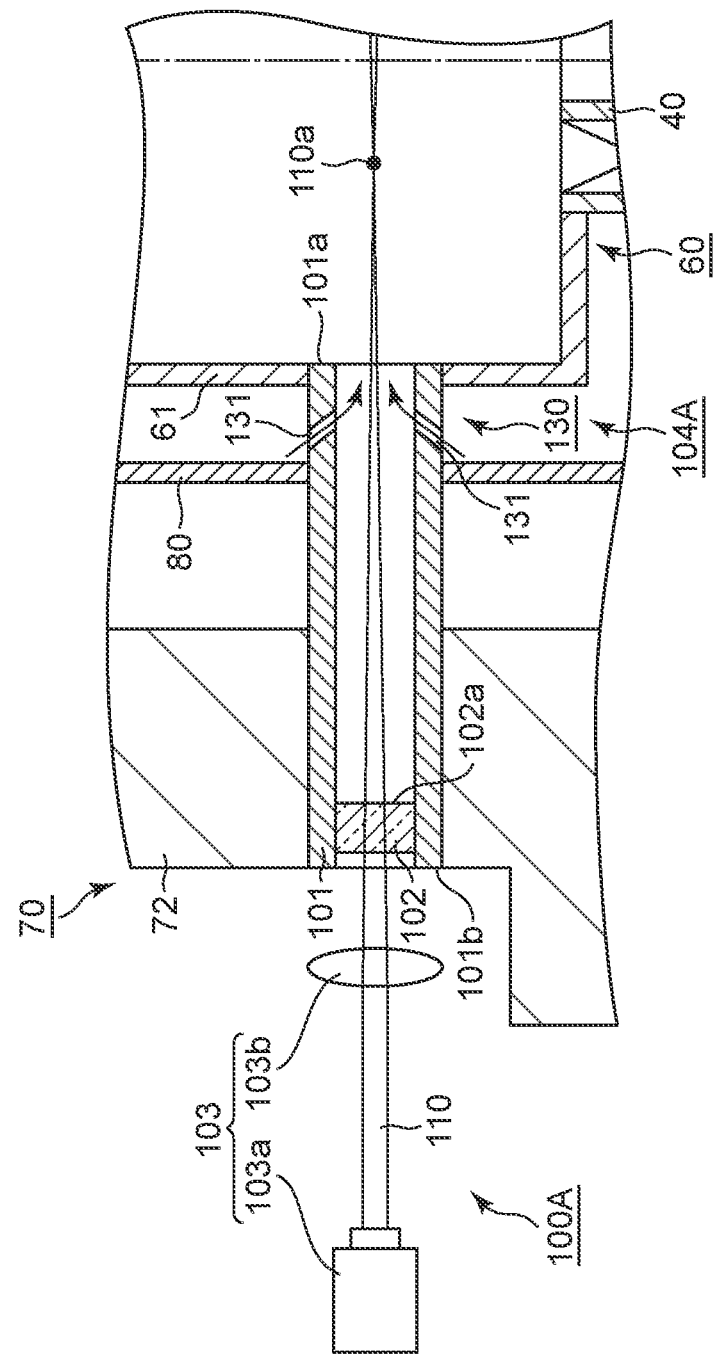
FIG. 4 is an enlarged view schematically illustrating a longitudinal section of the ignition device including another configuration in the combustor of the first embodiment.

FIG. 4 is an enlarged view schematically illustrating a longitudinal section of the ignition device 100A including another configuration in the combustor 20A of the first embodiment.

As illustrated in FIG. 4, ejection holes 131 may each be formed to be inclined to the end portion 101a side of the pipe-shaped member 101 relative to the direction perpendicular to the center axis of the pipe-shaped member 101. That is, the ejection holes 131 may each be formed to be inclined so that an outlet of the ejection hole 131 is located closer to the end portion 101a side of the pipe-shaped member 101 than an inlet of the ejection hole 131.

In this case, the contact prevention fluid ejected from the ejection holes 131 has a component of velocity along the center axis of the pipe-shaped member 101. This makes it likely to form a flow field of the contact prevention fluid having a penetration force to the extent of coming into contact with an outer periphery of the laser light 110 (laser beam) passing through the center of the pipe-shaped member 101. Then, the interior of the combustor liner 61 is irradiated with the laser light 110 in a state of suppressing an influence from the contact prevention fluid.

Second Embodiment

Figure 5:
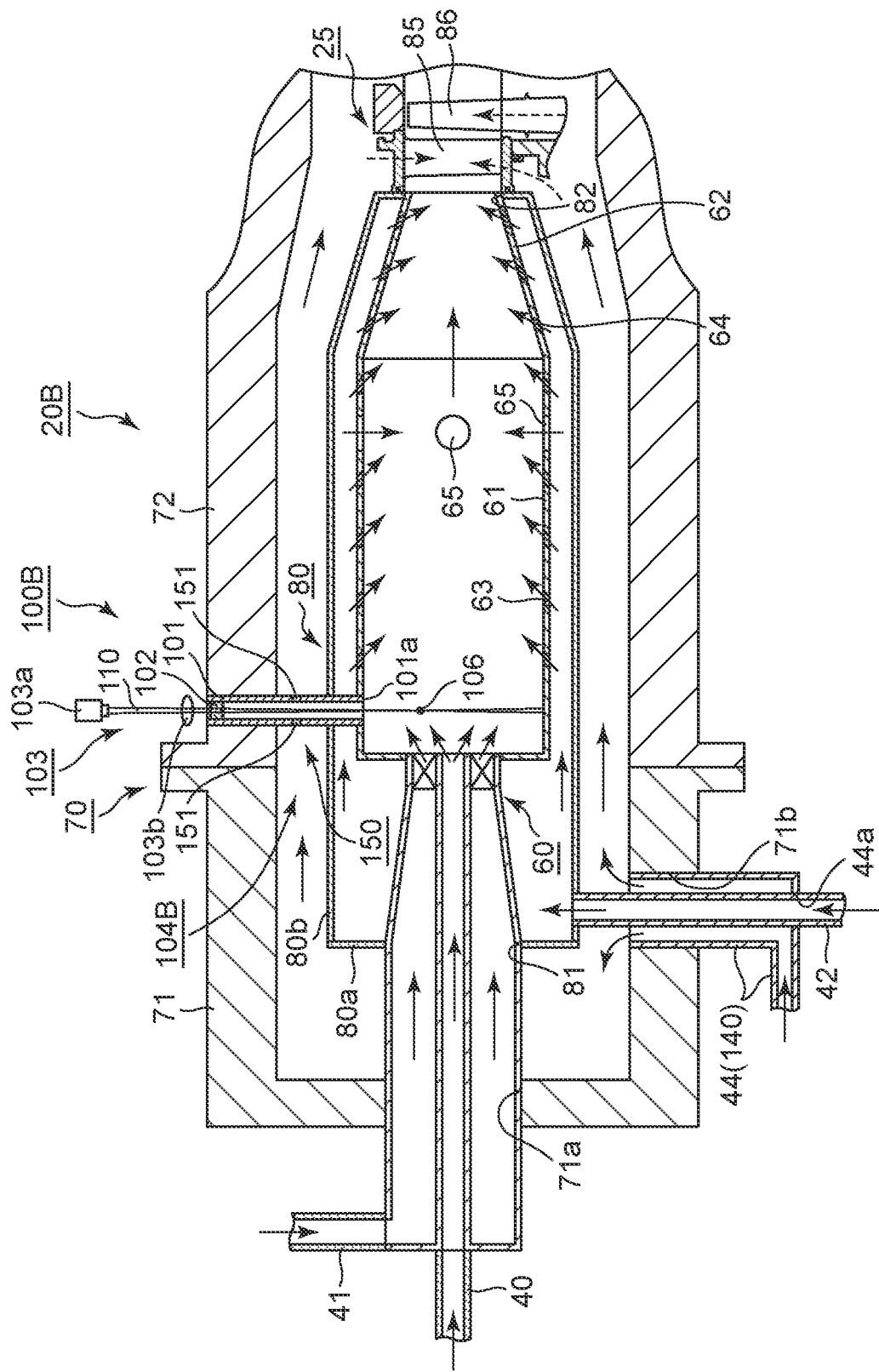
FIG. 5 is a view schematically illustrating a longitudinal section of a combustor of a second embodiment.
Figure 6:
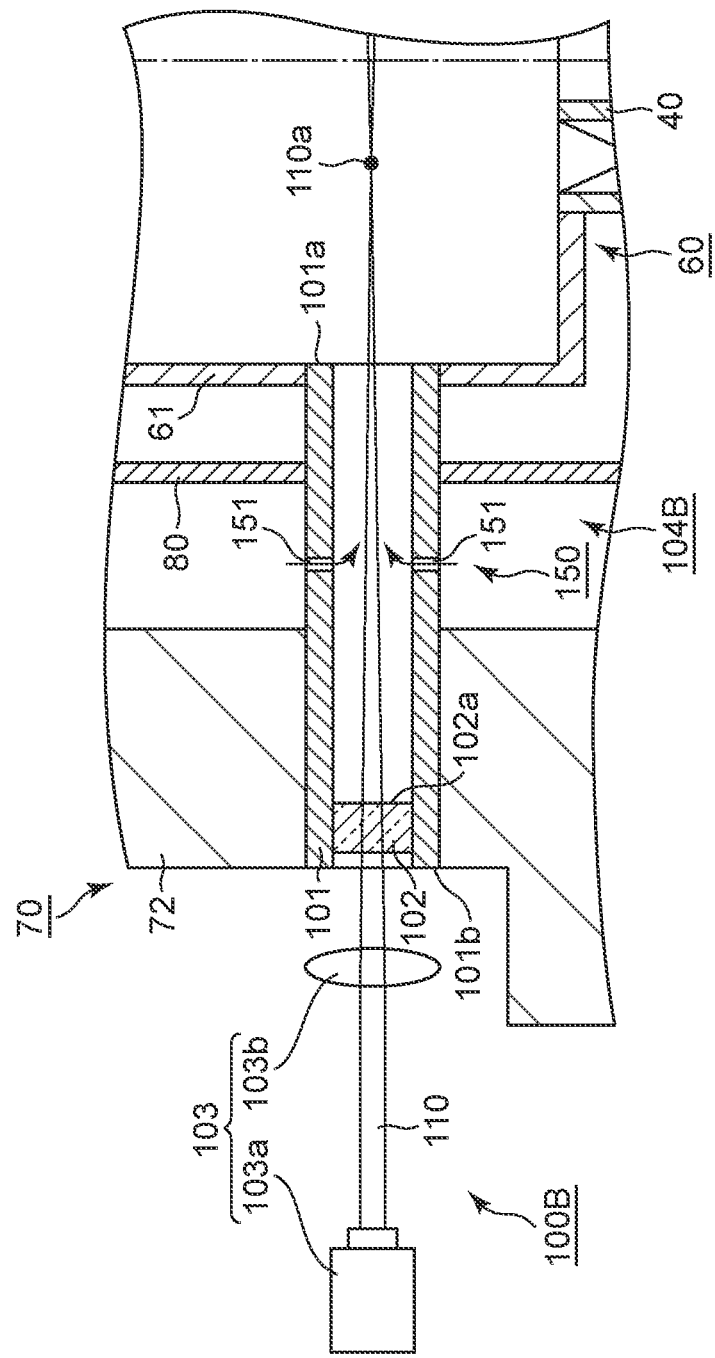
FIG. 6 is an enlarged view schematically illustrating a longitudinal section of an ignition device in the combustor of the second embodiment.

FIG. 5 is a view schematically illustrating a longitudinal section of a combustor 20B of a second embodiment. FIG. 6 is an enlarged view schematically illustrating a longitudinal section of an ignition device 100B in the combustor 20B of the second embodiment. Note that in the following embodiment, the same constituent portions as those of the combustor 20A of the first embodiment are denoted by the same reference signs, and redundant explanations are omitted or simplified.

The combustor 20B of the second embodiment has the same configuration as that of the combustor 20A of the first embodiment except a configuration of a contact prevention mechanism 104B of the ignition device 100B. Therefore, the configuration of the contact prevention mechanism 104B is mainly described here.

As illustrated in FIG. 5, the ignition device 100B includes a pipe-shaped member 101, a heat-resistant glass 102, a laser light supply mechanism 103, and the contact prevention mechanism 104B.

The contact prevention mechanism 104B prevents a combustion gas in a combustor liner 61 from coming into contact with the heat-resistant glass 102. The contact prevention mechanism 104B includes a fluid supply part 140 and an ejection part 150.

The fluid supply part 140 supplies a contact prevention fluid. The fluid supply part 140 supplies the contact prevention fluid between a combustor casing 70 and a cylinder body 80.

Here, the fluid supply part 140 is constituted of a pipe 44 which circulates the carbon dioxide pressurized by the compressor 28 between the combustor casing 70 and the cylinder body 80. Here, the carbon dioxide circulated by the pipe 44 is not heated in the heat exchanger 24.

Incidentally, the fluid supply part 140 functions as a first fluid supply part, and the contact prevention fluid to be supplied by the fluid supply part 140 functions as a first fluid.

Further, the carbon dioxide supplied between the combustor casing 70 and the cylinder body 80 also functions as a cooling medium to cool the combustor casing 70, the cylinder body 80 and the pipe-shaped member 101 of the ignition device 100B other than the function as the contact prevention fluid.

The ejection part 150 ejects the contact prevention fluid into the pipe-shaped member 101. The ejection part 150 has a plurality of ejection holes 151 formed in a circumferential direction of the pipe-shaped member 101.

The ejection part 150 is formed in the pipe-shaped member 101 located between the combustor casing 70 and the cylinder body 80, for example. In other words, the ejection holes 151 are formed in the circumferential direction of the pipe-shaped member 101 located between the combustor casing 70 and the cylinder body 80.

A shape and a disposition configuration of the ejection holes 151 are the same as those of the ejection holes 131 of the first embodiment. Further, the ejection holes 151 each penetrate in a direction perpendicular to a center axis of the pipe-shaped member 101, for example.

Incidentally, as exemplified by the first embodiment (refer to FIG. 4), the ejection holes 151 may each be formed to be inclined to an end portion 101a side of the pipe-shaped member 101 relative to the direction perpendicular to the center axis of the pipe-shaped member 101. An effect obtained by the above is the same as the effect described by the first embodiment.

Here, a pressure of the contact prevention fluid to be ejected into the pipe-shaped member 101 is higher than a pressure in the combustor liner 61. Therefore, the combustion gas flowing into the pipe-shaped member 101 does not pass through the ejection holes 151 to flow in between the combustor casing 70 and the cylinder body 80. In other words, the contact prevention fluid ejected from the ejection holes 151 into the pipe-shaped member 101 flows into the combustor liner 61.

Next, the operation of the combustor 20B is described.

Here, the operation of the contact prevention mechanism 104B is described.

A part of the carbon dioxide introduced between the combustor casing 70 and the cylinder body 80 from the pipe 44 functions as the contact prevention fluid. As illustrated in FIG. 6, a part of the carbon dioxide passes through the ejection holes 151 of the pipe-shaped member 101 to be ejected into the pipe-shaped member 101. Note that in FIG. 6, flows of the carbon dioxide (contact prevention fluid) ejected from the ejection holes 151 are indicated by arrows.

The flows of the carbon dioxide (contact prevention fluid) ejected from the ejection holes 151 are similar to the flows of the carbon dioxide (contact prevention fluid) ejected from the ejection holes 131 in the first embodiment. That is, the flows of the carbon dioxide (contact prevention fluid) ejected from the ejection holes 151 each travel in the direction perpendicular to the center axis of the pipe-shaped member 101, and at the same time, turn to the combustor liner 61 side, as illustrated in FIG. 6, for example.

Further, in the interior of the pipe-shaped member 101 being an inner side of the ejection holes 151, such a flow field as to shut off a cross section of the interior of the pipe-shaped member 101 is formed by the carbon dioxide ejected from the plurality of ejection holes 151 formed in the circumferential direction.

The flows formed by the carbon dioxide ejected from the ejection holes 151 prevent the combustion gas in the combustor liner 61 from flowing into the pipe-shaped member 101. Alternatively, the flows formed by the carbon dioxide ejected from the ejection holes 151 prevent the combustion gas flowing from the interior of the combustor liner 61 into the pipe-shaped member 101 from flowing into the side closer to the heat-resistant glass 102 from positions formed with the ejection holes 151.

This makes it possible to prevent the combustion gas in the combustor liner 61 from coming into contact with the heat-resistant glass 102 (an inner surface 102a of the heat-resistant glass 102). Then, impurities such as soot contained in the combustion gas do not adhere to the inner surface 102a of the heat-resistant glass 102. Therefore, it is possible to prevent a reduction in transmittance of the laser light 110 passing through the heat-resistant glass 102.

Incidentally, similarly to the first embodiment, a flow rate of the contact prevention fluid to be ejected to the pipe-shaped member 101 can be regulated by a hole diameter of the ejection hole 151 and the number of the ejection holes 151. An effect obtained by the above is also the same as that of the first embodiment.

On one hand, the remaining part of the carbon dioxide introduced between the combustor casing 70 and the cylinder body 80 from the pipe 44 flows through an annular space between the combustor casing 70 and the cylinder body 80 to the downstream side. At this time, similarly to the first embodiment, the carbon dioxide cools the combustor casing 70, the cylinder body 80 and the pipe-shaped member 101 of the ignition device 110B.

According to the combustor 20B of the second embodiment as described above, including the contact prevention mechanism 104B makes it possible to prevent the contact between the heat-resistant glass 102 included in the pipe-shaped member 101 of the ignition device 100B and the combustion gas. Therefore, the impurities such as soot do not adhere to the inner surface 102a of the heat-resistant glass 102. This prevents the reduction in transmittance of the laser light 110 passing through the heat-resistant glass 102, resulting in enabling stable ignition.

Third Embodiment

Figure 7:
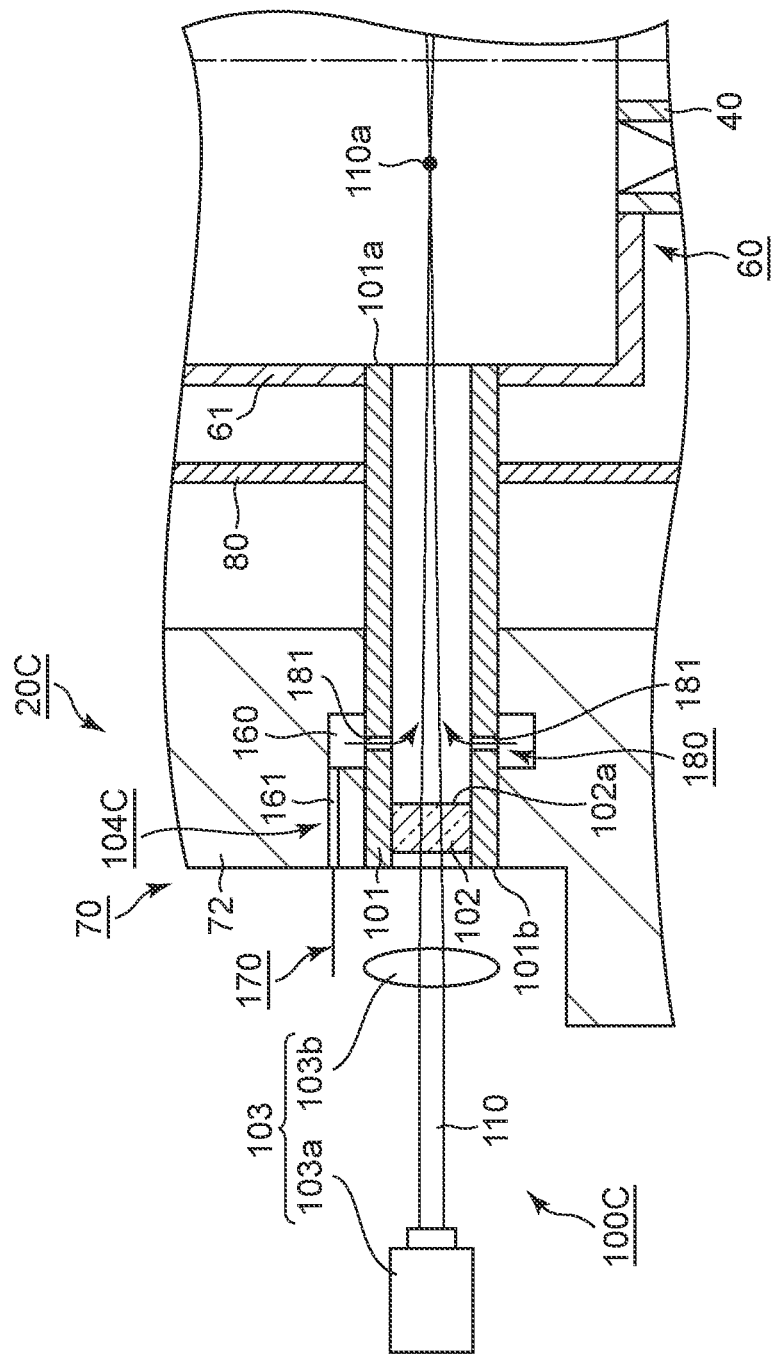
FIG. 7 is an enlarged view schematically illustrating a longitudinal section of an ignition device in a combustor of a third embodiment.

FIG. 7 is an enlarged view schematically illustrating a longitudinal section of an ignition device 100C in a combustor 20C of a third embodiment.

The combustor 20C of the third embodiment has the same configuration as that of the combustor 20A of the first embodiment except a configuration of a contact prevention mechanism 104C of the ignition device 100C. Therefore, the configuration of the contact prevention mechanism 104C is mainly described here.

As illustrated in FIG. 7, the ignition device 100C includes a pipe-shaped member 101, a heat-resistant glass 102, a laser light supply mechanism 103, and the contact prevention mechanism 104C.

The contact prevention mechanism 104C prevents a combustion gas in a combustor liner 61 from coming into contact with the heat-resistant glass 102. The contact prevention mechanism 104C includes an annular groove 160, a flow path 161, a fluid supply part 170 and an ejection part 180.

The annular groove 160 is formed around a periphery of the pipe-shaped member 101 in a combustor casing 70 (for example, a downstream-side casing 72) through which the pipe-shaped member 101 penetrates. The annular groove 160 is formed on a side closer to a combustor liner 61 from the heat-resistant glass 102 in the combustor casing 70.

The flow path 161 is a flow path coupling the outside of the combustor casing 70 and the annular groove 160. The flow path 161 is constituted by a through hole penetrating from a side surface of the combustor casing 70 to the annular groove 160.

The fluid supply part 170 supplies a contact prevention fluid to the flow path 161. Specifically, the fluid supply part 170 is coupled to the flow path 161.

Here, the fluid supply part 170 may be constituted by a pipe branching off from the pipe 42 which circulates the carbon dioxide heated in the heat exchanger 24 between the combustor liner 61 and the cylinder body 80 (refer to FIG. 1), for example.

Further, the fluid supply part 170 may be constituted by a pipe branching off from the pipe 44 which circulates the carbon dioxide pressurized by the compressor 28 between the combustor casing 70 and the cylinder body 80 (refer to FIG. 1), for example.

Here, when the fluid supply part 170 is constituted by each of the pipes branching off from the system of the gas turbine facility 10 as described above, a filter (not illustrated) is preferably interposed in the fluid supply part 170. Passing through the filter enables removal of foreign matter contained in a flow of the carbon dioxide. This makes it possible to prevent the foreign matter from flowing into the combustor liner 61 and the turbine 25.

Moreover, the fluid supply part 170 may be a supply system (supply pipe) other than the system of the gas turbine facility 10, for example. Also in this case, the fluid supply part 170 supplies carbon dioxide at a supercritical pressure as the contact prevention fluid to the flow path 161.

Here, even in any of the above-described configurations, the fluid supply part 170 supplies the contact prevention fluid to the flow path 161 so that a pressure of the contact prevention fluid to be ejected from the ejection part 180 into the pipe-shaped member 101 is higher than a pressure in the combustor liner 61.

Incidentally, the fluid supply part 170 functions as a second fluid supply part. Further, the contact prevention fluid to be supplied from the fluid supply part 170 functions as a second fluid.

The ejection part 180 ejects the contact prevention fluid supplied to the annular groove 160 into the pipe-shaped member 101. The ejection part 180 has a plurality of ejection holes 181 formed in a circumferential direction of the pipe-shaped member 101.

The ejection part 180 is formed in the pipe-shaped member 101 in a position formed with the annular groove 160, as illustrated in FIG. 7. In other words, the ejection holes 181 are formed in the circumferential direction of the pipe-shaped member 101 in the position formed with the annular groove 160.

A shape and a disposition configuration of the ejection holes 181 are the same as those of the ejection holes 131 of the first embodiment. Further, the ejection holes 181 each penetrate in a direction perpendicular to a center axis of the pipe-shaped member 101, for example.

Incidentally, as exemplified by the first embodiment (refer to FIG. 4), the ejection holes 181 may each be formed to be inclined to an end portion 101*a* side of the pipe-shaped member 101 relative to the direction perpendicular to the center axis of the pipe-shaped member 101. An effect obtained by the above is the same as the effect described by the first embodiment.

Here, the pressure of the contact prevention fluid to be ejected into the pipe-shaped member 101 is higher than the pressure in the combustor liner 61. Therefore, the combustion gas flowing into the pipe-shaped member 101 does not pass through the ejection holes 181 to flow into the annular groove 160. In other words, the contact prevention fluid ejected from the ejection holes 181 into the pipe-shaped member 101 flows into the combustor liner 61.

Next, the operation of the combustor 20C is described.

Here, the operation of the contact prevention mechanism 104C is described.

The contact prevention fluid supplied from the fluid supply part 170 to the annular groove 160 expands in the circumferential direction in the annular groove 160. The contact prevention fluid expanded in the circumferential direction in the annular groove 160 is ejected through the ejection holes 181 of the pipe-shaped member 101 into the pipe-shaped member 101. Note that in FIG. 7, flows of the contact prevention fluid ejected from the ejection holes 181 are indicated by arrows. Further, a flow rate of the contact prevention fluid ejected from each of the ejection holes 181 is nearly uniform. Here, for example, fixing an end portion 101*b* on an outer side of the pipe-shaped member 101 to the combustor casing 70 by welding prevents the contact prevention fluid introduced to the annular groove 160 from leaking outside the combustor casing 70.

The flows of the carbon dioxide (contact prevention fluid) ejected from the ejection holes 181 are similar to the flows of the carbon dioxide (contact prevention fluid) ejected from the ejection holes 131 in the first embodiment. That is, the flows of the contact prevention fluid ejected from the ejection holes 181 each travel in the direction perpendicular to the center axis of the pipe-shaped member 101, and at the same time, turn to the combustor liner 61 side, as illustrated in FIG. 7, for example.

Further, in the interior of the pipe-shaped member 101 being an inner side of the ejection holes 181, such a flow field as to shut off a cross section of the interior of the pipe-shaped member 101 is formed by the contact prevention fluid ejected from the plurality of ejection holes 181 formed in the circumferential direction.

The flows formed by the contact prevention fluid ejected from the ejection holes 181 prevent the combustion gas in the combustor liner 61 from flowing into the pipe-shaped member 101. Alternatively, the flows formed by the contact prevention fluid ejected from the ejection holes 181 prevent the combustion gas flowing from the interior of the combustor liner 61 into the pipe-shaped member 101 from flowing into the side closer to the heat-resistant glass 102 from positions formed with the ejection holes 181.

This makes it possible to prevent the combustion gas in the combustor liner 61 from coming into contact with the heat-resistant glass 102 (an inner surface 102*a* of the heat-resistant glass 102). Then, impurities such as soot contained in the combustion gas do not adhere to the inner surface 102*a* of the heat-resistant glass 102. Therefore, it is possible to prevent a reduction in transmittance of the laser light 110 passing through the heat-resistant glass 102.

Incidentally, similarly to the first embodiment, a flow rate of the contact prevention fluid to be ejected to the pipe-shaped member 101 can be regulated by a hole diameter of the ejection hole 181 and the number of the ejection holes 181. An effect obtained by the above is also the same as that of the first embodiment.

According to the combustor 20C of the third embodiment as described above, including the contact prevention mechanism 104C makes it possible to prevent the contact between the heat-resistant glass 102 included in the pipe-shaped member 101 of the ignition device 100C and the combustion gas. Therefore, the impurities such as soot do not adhere to the inner surface 102*a* of the heat-resistant glass 102. This prevents the reduction in transmittance of the laser light 110 passing through the heat-resistant glass 102, resulting in enabling stable ignition.

Figure 8:
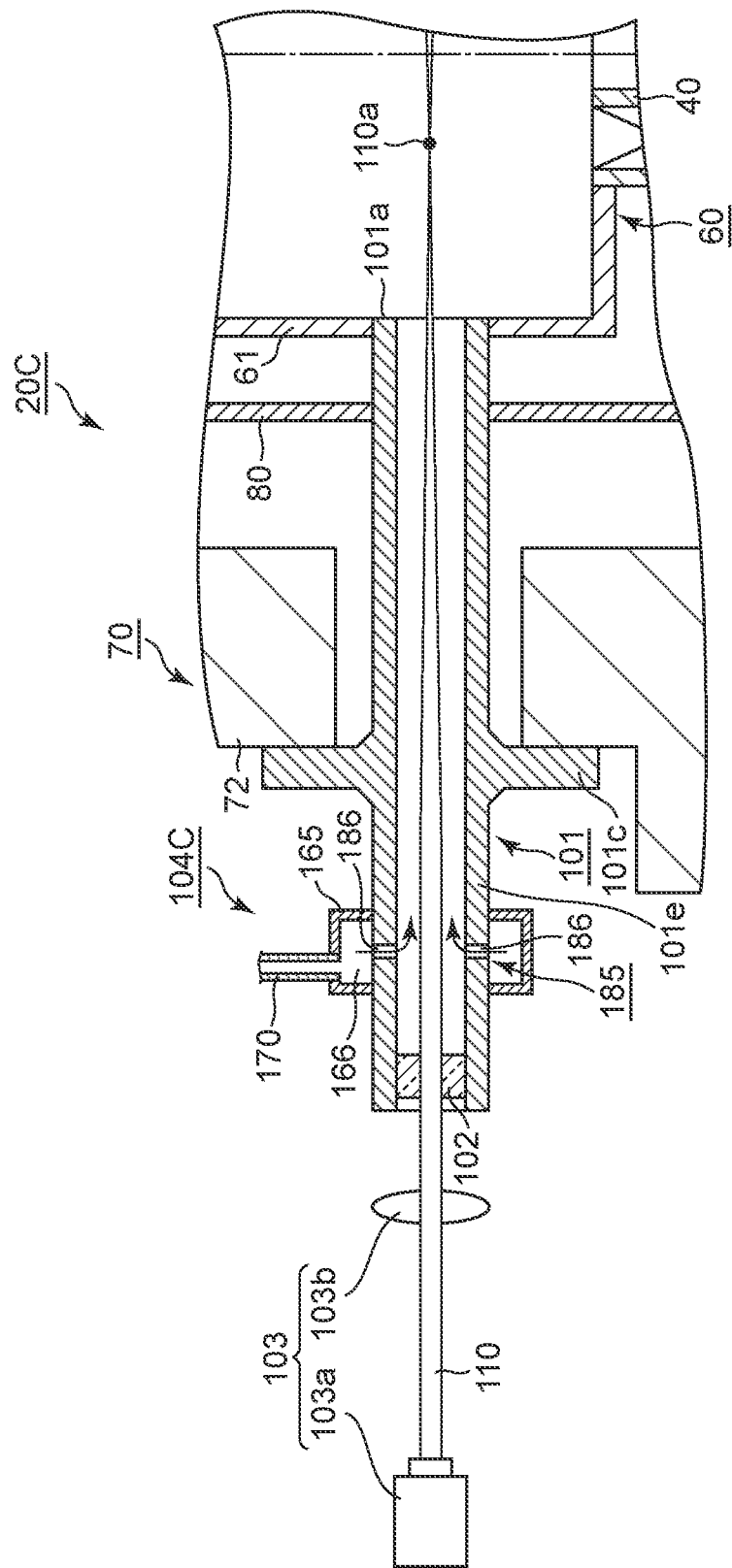
FIG. 8 is an enlarged view schematically illustrating a longitudinal section of the ignition device including another configuration in the combustor of the third embodiment.

Here, a configuration of the contact prevention mechanism 104C in the combustor 20C is not limited to the above-described structure. FIG. 8 is an enlarged view schematically illustrating a longitudinal section of the ignition device 100C including another configuration in the combustor 20C of the third embodiment.

As illustrated in FIG. 8, the contact prevention mechanism 104C may be provided outside the combustor casing 70.

In this case, the pipe-shaped member 101 is constituted by a cylindrical pipe having both ends thereof opened, or the like. The pipe-shaped member 101 is provided to penetrate the combustor casing 70, the cylinder body 80 and the combustor liner 61.

Further, one end side of the pipe-shaped member 101 projects from the combustor casing 70 to the outside. That is, the one end side of the pipe-shaped member 101 is extended to the outside of the combustor casing 70. Note that in the pipe-shaped member 101, a portion projecting from the combustor casing 70 to the outside is referred to as an outside projecting portion 101*e*.

Further, on an outer periphery of the outside projecting portion 101*e* of the pipe-shaped member 101, for example, a flange 101*c* is included. Then, attaching the flange 101*c* on an outer surface of the combustor casing 70 makes the pipe-shaped member 101 be fixed thereto.

The outside projecting portion 101*e* is provided with the contact prevention mechanism 104C. Then, the heat-resistant glass 102 is disposed in the pipe-shaped member 101 on a side closer to the outside (laser light supply mechanism 103 side) than a position provided with the contact prevention mechanism 104C.

The contact prevention mechanism 104C includes an annular member 165, a fluid supply part 170 and an ejection part 185.

The annular member 165 is provided on the outer periphery of the outside projecting portion 101e over the circumferential direction, as illustrated in FIG. 8. A cross-sectional shape perpendicular to the circumferential direction in the annular member 165 is a U-shape. Then, the annular member 165 has a hollow portion. An open side (inner peripheral side) of the annular member 165 is joined to the outer periphery of the outside projecting portion 101e. By including the annular member 165 as described above, an annular passage 166 is formed on the outer periphery of the outside projecting portion 101e.

Further, the annular member 165 is disposed between a position provided with the flange 101c and a position provided with the heat-resistant glass 102 in an axial direction of the pipe-shaped member 101.

The fluid supply part 170 supplies the contact prevention fluid to the annular passage 166. Specifically, the fluid supply part 170 is connected to the annular member 165. Note that a pipe constituting the fluid supply part 170, or the like is as previously described.

The ejection part 185 ejects the contact prevention fluid supplied to the annular passage 166 in the annular member 165 into the pipe-shaped member 101. The ejection part 185 has a plurality of ejection holes 186 formed in a circumferential direction of the outside projecting portion 101e.

The ejection holes 186 are formed in the pipe-shaped member 101 in a position formed with the annular passage 166, as illustrated in FIG. 8. In other words, the ejection holes 186 are formed in the circumferential direction of the outside projecting portion 101e in the position formed with the annular passage 166. A shape and a configuration of the ejection holes 186 are the same as the previously-described shape and configuration of the ejection holes 181.

Here, the contact prevention fluid supplied from the fluid supply part 170 to the annular passage 166 expands in the circumferential direction in the annular passage 166. Then, the contact prevention fluid expanded in the annular passage 166 is ejected from the ejection holes 186 into the pipe-shaped member 101. Flows of the contact prevention fluid ejected from the ejection holes 186 into the pipe-shaped member 101 are similar to the previously-described flows of the contact prevention fluid ejected from the ejection holes 181 into the pipe-shaped member 101.

Incidentally, a pressure of the contact prevention fluid to be ejected into the pipe-shaped member 101 is higher than a pressure in the combustor liner 61. Therefore, the combustion gas flowing into the pipe-shaped member 101 does not pass through the ejection holes 186 to flow into the annular passage 166. In other words, the contact prevention fluid ejected from the ejection holes 186 into the pipe-shaped member 101 flows into the combustor liner 61.

Fourth Embodiment

Figure 9:
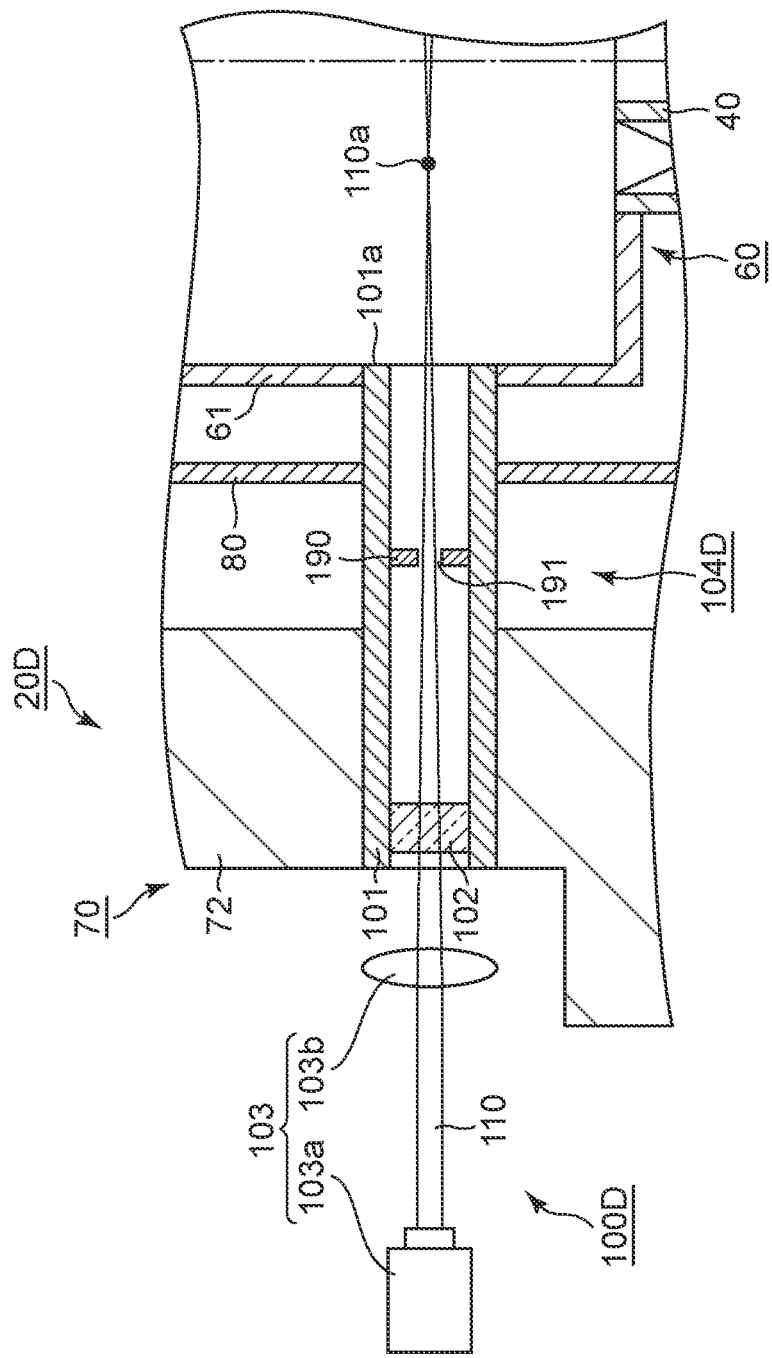
FIG. 9 is an enlarged view schematically illustrating a longitudinal section of an ignition device in a combustor of a fourth embodiment.

FIG. 9 is an enlarged view schematically illustrating a longitudinal section of an ignition device 100D in a combustor 20D of a fourth embodiment.

The combustor 20D of the fourth embodiment has the same configuration as that of the combustor 20A of the first embodiment except a configuration of a contact prevention mechanism 104D of the ignition device 100D. Therefore, the configuration of the contact prevention mechanism 104D is mainly described here.

As illustrated in FIG. 9, the ignition device 100D includes a pipe-shaped member 101, a heat-resistant glass 102, a laser light supply mechanism 103, and the contact prevention mechanism 104D.

The contact prevention mechanism 104D prevents a combustion gas in a combustor liner 61 from coming into contact with the heat-resistant glass 102. The contact prevention mechanism 104D includes an orifice member 190.

The orifice member 190 is constituted by a circular plate-shaped member provided in the pipe-shaped member 101. The orifice member 190 has a through hole 191 which passes a laser light 110 through the center thereof.

An outer periphery of the orifice member 190 is in contact with an inner periphery of the pipe-shaped member 101. Such a configuration makes it possible to prevent the combustion gas from flowing from between the outer periphery of the orifice member 190 and an inner surface of the pipe-shaped member 101 into the heat-resistant glass 102 side. Note that an outer shape of the orifice member 190 is formed to correspond to a shape of an interior of the pipe-shaped member 101 in which the orifice member 190 is disposed.

A bore of the through hole 191 is set to a size to the extent that the laser light 110 is not prevented from passing therethrough.

Here, one example of including the orifice member 190 in the pipe-shaped member 101 between a combustor casing 70 and a cylinder body 80 is indicated, but this configuration is not restrictive.

For example, the orifice member 190 may be included in the pipe-shaped member 101 between a combustor liner 61 and the cylinder body 80.

Here, since the laser light 110 is focused by a condensing lens 103b, a beam diameter of the laser light 110 is reduced to a focal point 110a. Therefore, including the orifice member 190 on the combustor liner 61 side allows the bore of the through hole 191 to be smaller. This makes it possible to more securely suppress a flow of the combustion gas flowing through the through hole 191 into the heat-resistant glass 102 side.

Next, the operation of the combustor 20D is described.

Here, the operation of the contact prevention mechanism 104D is described.

At the time of ignition, the laser light 110 oscillated by a laser oscillator 103a passes through the condensing lens 103b, the heat-resistant glass 102, and the through hole 191 of the orifice member 190 to enter the pipe-shaped member 101. The laser light 110 having passed through the interior of the pipe-shaped member 101 is focused on the focal point 110a in a predetermined region in the combustor liner 61.

The inflow to the heat-resistant glass 102 side of the combustion gas flowing into the pipe-shaped member 101 is blocked by the orifice member 190. Note that even though the combustion gas flows through the through hole 191 to the heat-resistant glass 102 side, a flow amount thereof is a very small amount. Therefore, impurities such as soot do not adhere to an inner surface 102a of the heat-resistant glass 102.

According to the combustor 20D of the fourth embodiment as described above, including the contact prevention mechanism 104D makes it possible to suppress the contact between the heat-resistant glass 102 included in the pipe-shaped member 101 of the ignition device 100D and the combustion gas. Therefore, the impurities such as soot do not adhere to the inner surface 102a of the heat-resistant glass 102. This prevents the reduction in transmittance of the laser light 110 passing through the heat-resistant glass 102, resulting in enabling stable ignition.

Here, a configuration of the combustor 20D of the fourth embodiment is not limited to the above-described configuration.

For example, when the orifice member 190 is included in the pipe-shaped member 101 between the combustor casing 70 and the cylinder body 80, the contact prevention mechanism 104C of the third embodiment may be further included. Further, when the orifice member 190 is included in the pipe-shaped member 101 between the combustor casing 70 and the cylinder body 80, the contact prevention mechanism 104B of the second embodiment may be further included on the combustor casing 70 side of the orifice member 190.

For example, when the orifice member 190 is included in the pipe-shaped member 101 between the combustor liner 61 and the cylinder body 80, the contact prevention mechanism 104B of the second embodiment or the contact prevention mechanism 104C of the third embodiment may be further included. Further, when the orifice member 190 is included in the pipe-shaped member 101 between the combustor liner 61 and the cylinder body 80, the contact prevention mechanism 104A of the first embodiment may be further included on the combustor casing 70 side of the orifice member 190.

In any of the cases, the contact prevention fluids ejected from the ejection holes 131, 151, 181 of the contact prevention mechanisms 104A, 104B, 104C into the pipe-shaped member 101 each flow through the through hole 191 of the orifice member 190 to the combustor liner 61 side. This makes it possible to prevent the combustion gas from flowing through the through hole 191 to the heat-resistant glass 102 side.

Fifth Embodiment

Figure 10:
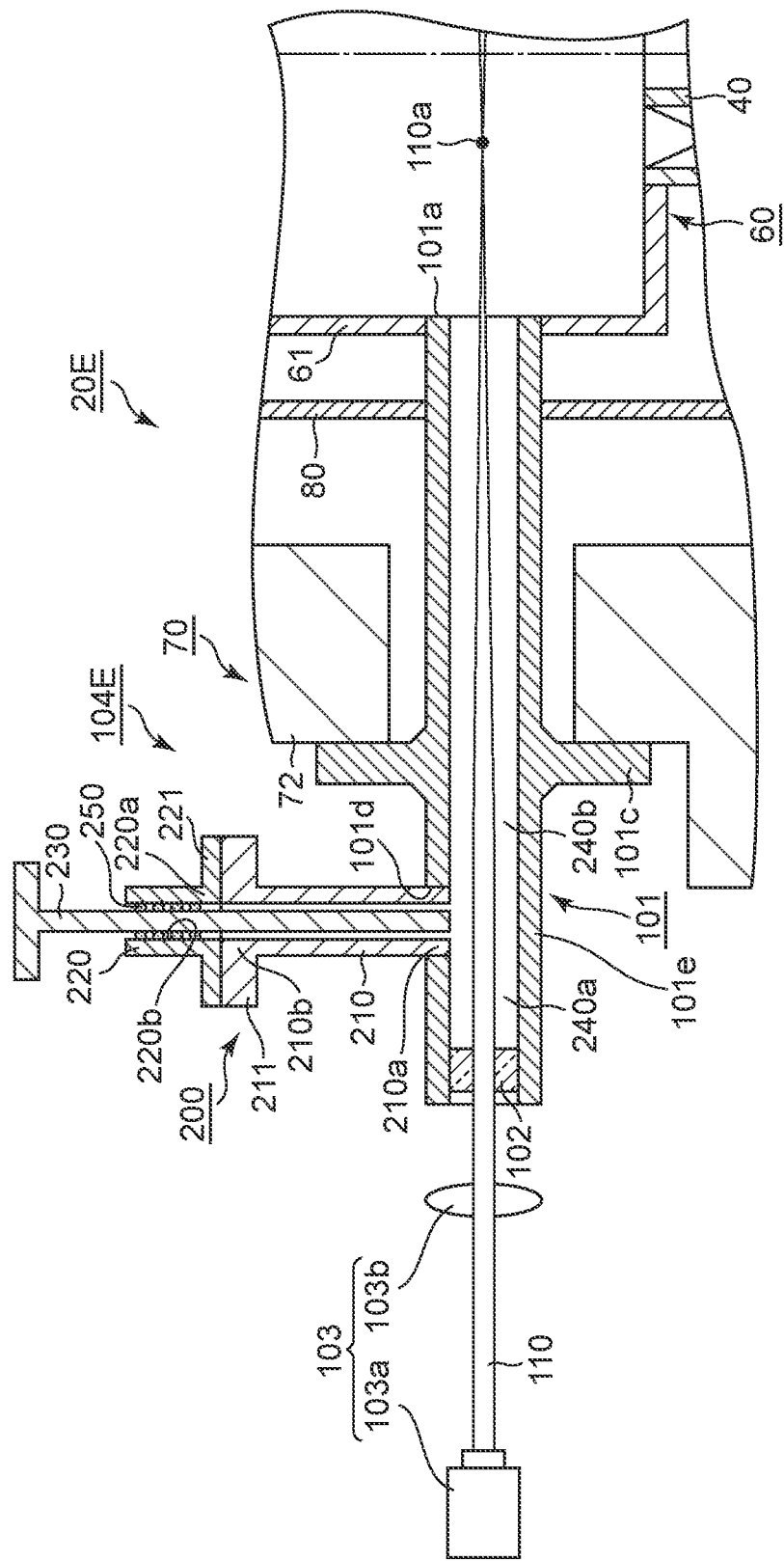
FIG. 10 is an enlarged view schematically illustrating a longitudinal section of an ignition device in a combustor of a fifth embodiment.

FIG. 10 is an enlarged view schematically illustrating a longitudinal section of an ignition device 100E in a combustor 20E of a fifth embodiment. Note that FIG. 10 illustrates a state where a shutoff valve 200 is opened.

The combustor 20E of the fifth embodiment has the same configuration as that of the combustor 20A of the first embodiment except a configuration of a contact prevention mechanism 104E of the ignition device 100E. Therefore, the configuration of the contact prevention mechanism 104E is mainly described here.

As illustrated in FIG. 10, the ignition device 100E includes a pipe-shaped member 101, a heat-resistant glass 102, a laser light supply mechanism 103, and the contact prevention mechanism 104E.

The pipe-shaped member 101 is constituted by a cylindrical pipe having both ends thereof opened, or the like. The pipe-shaped member 101 is provided to penetrate a combustor casing 70, a cylinder body 80 and a combustor liner 61. Further, one end side of the pipe-shaped member 101 projects from the combustor casing 70 to the outside. That is, the one end side of the pipe-shaped member 101 is extended to the outside of the combustor casing 70. Note that in the pipe-shaped member 101, a portion projecting from the combustor casing 70 to the outside is referred to as an outside projecting portion 101e.

Further, on an outer periphery of the outside projecting portion 101e of the pipe-shaped member 101, for example, a flange 101c is included. Then, attaching the flange 101c on an outer surface of the combustor casing 70 makes the pipe-shaped member 101 be fixed thereto.

The outside projecting portion 101e is provided with the contact prevention mechanism 104E. Then, the heat-resistant glass 102 is disposed in the pipe-shaped member 101 on a side closer to the outside (laser light supply mechanism 103 side) than a position provided with the contact prevention mechanism 104E.

The contact prevention mechanism 104E prevents the combustion gas in the combustor liner 61 from coming into contact with the heat-resistant glass 102. The contact prevention mechanism 104E includes the shutoff valve 200.

The shutoff valve 200 is provided in a side portion of the outside projecting portion 101e. The shutoff valve 200 is disposed between a position provided with a flange 101c and a position provided with the heat-resistant glass 12 in an axial position of the pipe-shaped member 101. Then, the shutoff valve 200 communicates or shuts off a space 240a on the heat-resistant glass 102 side in the pipe-shaped member 101 and a space 240b on the combustor liner 61 side in the pipe-shaped member 101.

The shutoff valve 200 includes valve casings 210, 220 and a shutoff portion 230.

The valve casing 210 is constituted by a cylinder body having both ends thereof opened, or the like. As illustrated in FIG. 10, one end 210a of the valve casing 210 is fitted in and joined to an opening 101d formed in a sidewall of the outside projecting portion 101e. The other end 210b of the valve casing 210 has a flange 211, for example. Note that the valve casing 210 may be formed integrally with the outside projecting portion 101e.

The valve casing 220 is constituted by a cylinder body having both ends thereof opened, or the like. One end 220a of the valve casing 220 has a flange 221, for example. One valve casing is constituted by fastening the flange 221 of the valve casing 220 and the flange 211 of the valve casing 210 with a bolt, for example.

The shutoff portion 230 shuts off space in the pipe-shaped member 101. The shutoff portion 230 is provided to be movable forward and backward in the valve casings 210, 220. For example, in a state where the shutoff portion 230 is closed, namely a closed state, the space 240a and the space 240b are shut off. Here, in the closed state, the combustion gas flowing into the space 240b does not flow to the space 240a side.

A sealing member 250 such as packing is provided on an inner wall 220b of the valve casing 220. The shutoff portion 230 moves while coming into contact with the sealing member 250. Thus, the valve casing 220 and the shutoff portion 230 are sealed therebetween by the sealing member 250.

As the shutoff valve 200, for example, a needle valve, a ball valve, or the like can be used. Note that the shutoff valve 200 is not limited to these. As long as the shutoff valve 200 is a one which can shut off the space 240a and the space 240b when the shutoff portion 230 is closed, the one can be used.

Next, the operation of the combustor 20E is described.

Here, the operation of the contact prevention mechanism 104E is described.

At the time of ignition, the shutoff portion 230 is opened. Therefore, a laser light 110 oscillated by a laser oscillator 103a passes through a condensing lens 103b and the heat-resistant glass 102 to enter the pipe-shaped member 101. The laser light 110 having passed through the interior of the pipe-shaped member 101 is focused on a focal point 110a in a predetermined region in the combustor liner 61.

After confirming the ignition, the oscillation of the laser light 110 by the laser oscillator 103a is stopped, and at same time, the shutoff portion 230 is closed. This causes the space 240a and the space 240b to be shut off.

Therefore, the inflow to the heat-resistant glass 102 side of the combustion gas flowing into the pipe-shaped member 101 is blocked by the shutoff portion 230. This causes impurities such as soot not to adhere to an inner surface 102a of the heat-resistant glass 102.

According to the combustor 20E of the fifth embodiment as described above, including the contact prevention mechanism 104E makes it possible to suppress the contact between the heat-resistant glass 102 included in the pipe-shaped member 101 of the ignition device 100E and the combustion gas. Therefore, the impurities such as soot do not adhere to the inner surface 102a of the heat-resistant glass 102. This prevents the reduction in transmittance of the laser light 110 passing through the heat-resistant glass 102, resulting in enabling stable ignition.

According to the embodiments described above, it becomes possible to prevent the impurities such as soot from adhering to the heat-resistant glass of the laser ignition device and to perform stable ignition.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gas turbine combustor, comprising:
a casing;
a combustion cylinder which is provided in the casing and is configured to combust fuel and oxidant to produce combustion gas;
a pipe-shaped member provided to penetrate the casing and the combustion cylinder;
a heat-resistant glass which is provided on the casing side in the pipe-shaped member and disposed to close the pipe-shaped member;
a laser light supply configured to irradiate an interior of the combustion cylinder through the heat-resistant glass and an interior of the pipe-shaped member with a laser light; and
a contact prevention mechanism configured to prevent the combustion gas in the combustion cylinder from coming into contact with the heat-resistant glass,
wherein the pipe-shaped member has an outside projecting portion projecting to an outside of the casing; and
the contact prevention mechanism comprises:
an annular member which is provided on an outer periphery of the outside projecting portion over a circumferential direction and includes an annular passage;
a fluid supply part configured to supply a fluid to the annular passage; and
an ejection part which has a plurality of ejection holes formed in a circumferential direction of the outside projecting portion and is configured to eject the fluid supplied to the annular passage through the ejection holes into the pipe-shaped member.

2. The gas turbine combustor according to claim 1, wherein
the fluid is a portion of the combustion gas discharged from the combustion cylinder to drive a turbine.

* * * * *